US007136246B2

(12) United States Patent
Khanna et al.

(10) Patent No.: US 7,136,246 B2
(45) Date of Patent: Nov. 14, 2006

(54) METHOD AND APPARATUS FOR LIMITING SHOCK DAMAGE TO HARD DISK DRIVE DURING OPERATION

(75) Inventors: Vijayeshwar D. Khanna, Millwood, NY (US); Sri M. Sri-Jayantha, Ossining, NY (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 523 days.

(21) Appl. No.: 10/660,898

(22) Filed: Sep. 11, 2003

(65) Prior Publication Data
US 2005/0057842 A1    Mar. 17, 2005

(51) Int. Cl.
G11B 19/02    (2006.01)
G11B 21/02    (2006.01)

(52) U.S. Cl. .......................... 360/69; 360/75
(58) Field of Classification Search ............ None
See application file for complete search history.

(56) References Cited

U.S. PATENT DOCUMENTS

| 5,640,290 A | * | 6/1997 | Khanna et al. | 360/97.01 |
|---|---|---|---|---|
| 5,903,409 A | * | 5/1999 | Allen et al. | 360/75 |
| 5,963,392 A | | 10/1999 | Sri-Jayantha et al. | 360/75 |
| 6,091,576 A | | 7/2000 | Eckerd et al. | 360/105 |
| 6,351,350 B1 | * | 2/2002 | Symons et al. | 360/244.9 |
| 2002/0071220 A1 | | 6/2002 | Iida et al. | 360/254.7 |
| 2002/0186492 A1 | * | 12/2002 | Smith | 360/69 |

FOREIGN PATENT DOCUMENTS

JP    03-168985    *    7/1991

OTHER PUBLICATIONS

English translation of JP 03-168985.*

* cited by examiner

Primary Examiner—Andrew L. Sniezek
(74) Attorney, Agent, or Firm—John L. Rogitz

(57) ABSTRACT

A disk drive controller establishes an active region on a disk that corresponds to a region of the disk wherein effects of mechanical shock to the disk drive during read and/or write operations are mitigated by a motion limiting element. The controller stores data in the active region based on frequency and/or recency of access of the data.

15 Claims, 3 Drawing Sheets

METHOD AND APPARATUS FOR LIMITING SHOCK DAMAGE TO HARD DISK DRIVE DURING OPERATION

FIELD OF THE INVENTION

The present invention relates generally to hard disk drives.

BACKGROUND OF THE INVENTION

Hard disk drives that are used in mobile computers have to be designed to withstand the rough usage typically seen in the mobile environment. The shock robustness of such drives has improved primarily in the ability to withstand large shocks during the nonoperating mode. Unfortunately, the ability of these drives to withstand rough handling during operation has not seen similar gains. Indeed, the operating shock specifications have typically lagged behind non-operational specifications by about a factor of four.

As a consequence, it is not unusual for a drive in a mobile environment to be rather easily damaged during use. Damage typically is non-catastrophic but results in the loss of data. As recognized herein, this damage by a lower magnitude shock event during operating conditions occurs by a slider-to-disk contact resulting from a disturbance in the air bearing due to the shock forces. Such an event is usually not accompanied by irreversible mechanical damage. However, for higher magnitude shock events, other mechanical components can start touching each other and this eventually can result in much more severe damage.

The present invention understands that the forces from the shock event will cause the mechanical components of the drive to vibrate and thereby may cause the suspension to start flapping up and down. The slider at first is not highly likely to contact the disk when the suspension moves down toward the disk because the slider is capable of withstanding significant forces that act normal towards the disk surface due to the restoring air bearing pressure beneath the slider, which increases exponentially as the slider is forced closer to the disk surface. However, when the suspension moves away from the disk, the preload it applies on the slider will be decreased proportionally. At some level of movement the preload will be overcome and the suspension will then attempt to pull the slider away from the disk surface. At some point it can be anticipated that the air bearing will be disrupted and the slider lifted off the disk. Subsequently when the suspension whips the head back towards the disk a few milliseconds later, the slider orientation is not likely to be optimally positioned to generate the air bearing instantly and so prevent a corner of the slider from touching the disk. This is when the slider-disk contact will occur.

As further recognized herein, many sliders use a negative pressure air bearing design in which pockets in the air bearing surface generate a vacuum that pulls the slider down towards the disk surface. The stable fly height of these sliders is the position where the suspension pre-load and this downward vacuum pull is balanced by the upward acting pressure under the air bearing portion of the slider. Having made the above critical observations, the present invention is provided.

SUMMARY OF THE INVENTION

A disk drive controller executes logic that establishes an active region on a disk in a disk drive associated with the controller. The active region corresponds to a region of the disk wherein effects of mechanical shock to the disk drive during read and/or write operations are mitigated compared to regions on the disk other than the active region.

The controller preferably stores data in the active region based on frequency and/or recency of access of the data. If desired, data may be moved from the active region to an archive region based on at least one of: recency of last access of the data, whether a time for archiving has occurred, and whether a motion sensing threshold has been reached. The active region may be an outer annular region of the disk or an inner annular region of the disk.

In preferred non-limiting embodiments, data is moved from the archive region to the active region if the data has been previously accessed within a predetermined period. The active region may be defined at least in part by a motion limiting element on the drive.

In another aspect, a hard disk drive includes means for establishing an active region on the disk. The active region corresponds to a region where the disk drive is protected from the effects of mechanical shock as compared to other regions of the disk drive. Means are provided for writing data to the active region.

In still another aspect, a hard disk drive includes a disk defining an active region and an archive region and a controller controlling read and write operations on the disk. A motion limiting element defines the active region.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
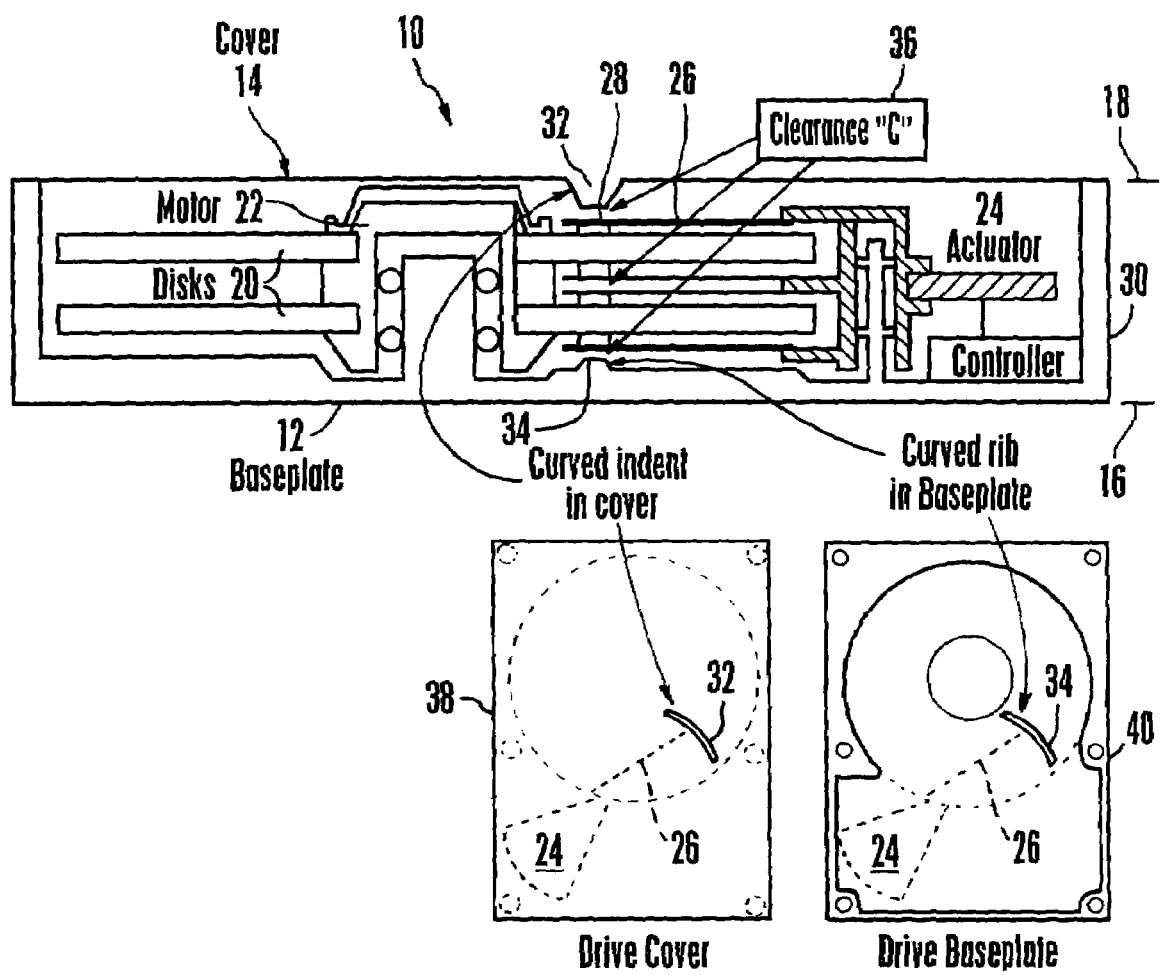
FIG. 1 shows a side view of one embodiment of the present disk drive with motion limiting element along with a plan view of the cover showing the arcuate indent and a plan view of the base showing the arcuate rib.

Referring initially to FIG. 1, a hard disk drive is shown, generally designated 10, which includes a rigid metal or plastic base 12 covered by a rigid cover 14. As shown, the base 12 defines a bottom plane 16, whereas the cover 14 defines a top plane 18 that is parallel to the plane 16 defined by the base 12.

The hard disk drive 10 can contain plural disks 20 rotated by a motor 22. An actuator 24, movably mounted within the base 12, is connected to plural suspensions 26 that extend over the disks 20, and the actuator 24 is controlled by a processor such as a controller 30. At the end of each suspension 26 is a respective slider 28 that includes one or more active elements known as "heads" for performing the read/write functions relating to the disks in accordance with principles known in the art. Together, a slider 28 and suspension 26 establish a slider/suspension assembly.

Still referring to FIG. 1, motion limiting elements are provided to limit the movement of suspensions 26 in the event of mechanical shock to the hard disk drive 10 during operation. In one illustrative embodiment, the motion limiting element can be established by an indent 32 that is formed in the cover 14. Also, the base plate 12 can have a rib 34. As shown, the indent 32 depends downwardly from the plane 18 of the cover 14, whereas the rib 34 extends upwardly from the plane 16 of the base 12. Both the indent 32 and rib 34 are designed to contact the nearest suspension 26 in the event of a mechanical shock that lifts the suspension (and, hence, associated slider 28) away from the disk 20, thereby mechanically limiting such movement.

The indent 32 and rib 34 are spaced from the nearest respective suspension 26 by a distance or clearance "C" 36. The suspensions and sliders of interior disks 20 do not require separate, discrete motion limiting elements. Instead, motion limiting for these sliders and suspensions is provided by maintaining the distance between adjacent disks to be twice the height of the slider plus suspension, plus the clearance C.

As intended by the present invention, the distance "C" is established to mechanically limit motion, by means of contact between the motion limiting element and suspension 26, of the suspension 26 away from the associated disk 20 when a shock occurs to the hard drive during operation. The distance "C" preferably is sufficiently small that in the event of a shock, the suspension 26 remains close enough to the associated disk 20 to avoid disrupting the air bearing between the slider 28 and disk 20. Stated differently, if the suspension 26 is constrained by the motion limiting element of the present invention to not move more than a distance "C" relative to the disk, the slider 28 will not be peeled away from the disk. Instead, within the distance "C" the operating vacuum between the slider 28 and disk 20 will remain strong enough to maintain an operationally sufficient attraction between the slider 28 and disk 20.

The indent 32 and rib 34 are shown in the plan views 38 and 40, respectively, of FIG. 1. As shown, the indent and rib are arcuate in shape across the plane of the respective disk 20, and both extend substantially all the way in the radial dimension across the data storage area of the respective disk.

The embodiment shown in FIG. 1 is particularly useful for single disk load-unload drives and for drives having plural disks if contact-start-stop (CSS) technology is used. It is preferred that the cover 14 be relatively rigid, and stiffened if need be, so that it (and, hence, its indent 18) does not vibrate excessively in the event of shock. Or, the cover 14 can be attached to the motor spindle (for stationary spindle motor designs), which in any case would stiffen the cover 14 at least in the radial inner regions.

Figure 2:
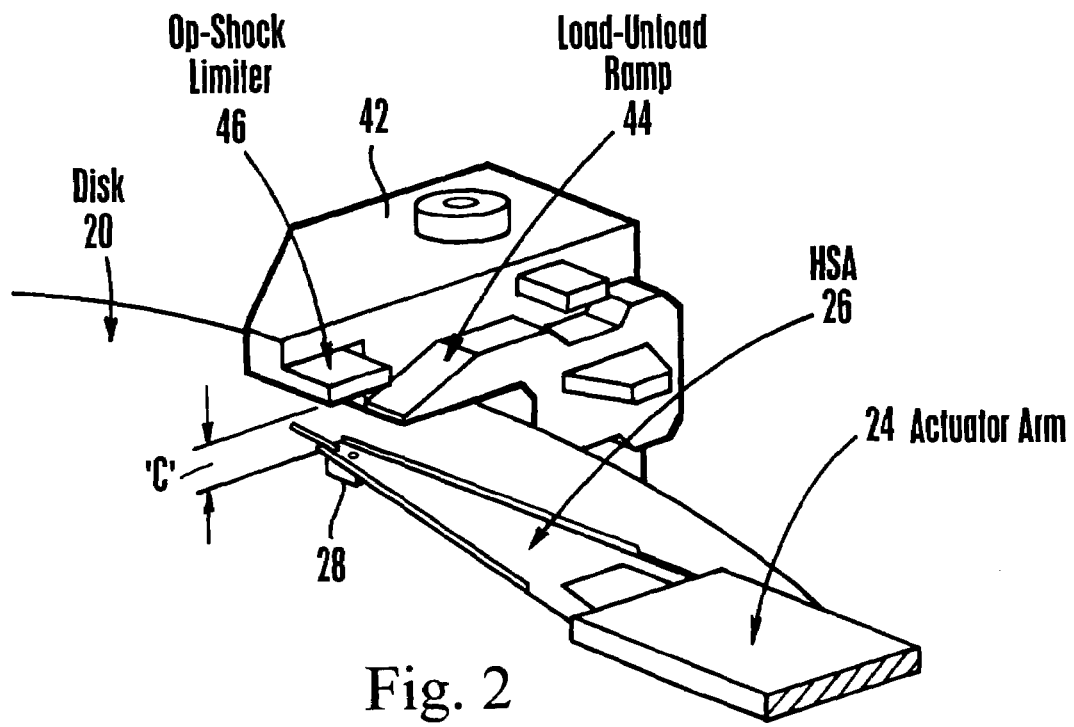
FIG. 2 is a detail perspective view of another embodiment of the motion limiting element juxtaposed with the load/unload ramp.
Figure 3:
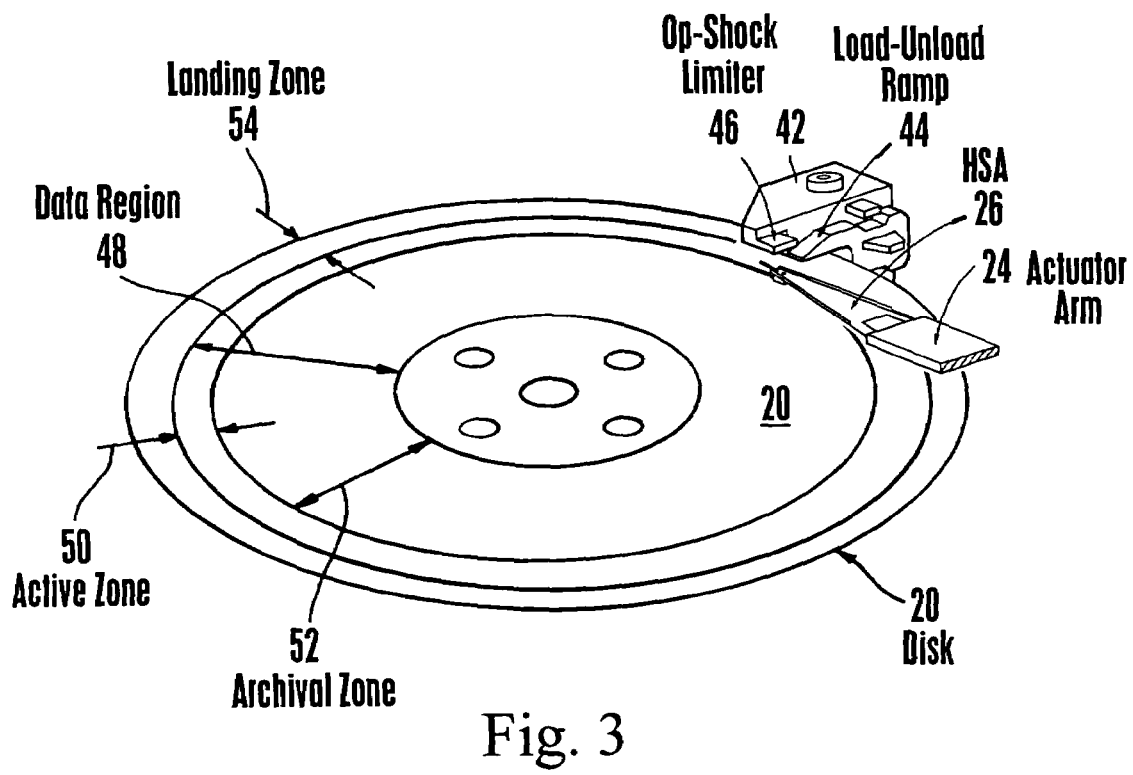
FIG. 3 is a perspective view of the motion limiting element shown in FIG. 2 in combination with the disk.

With the above considerations in mind, an alternate preferred embodiment is shown in FIGS. 2 and 3. A load/unload structure 42 can be provided in accordance with principles known in the art that includes a load/unload ramp 44 for loading and unloading a respective suspension 26/slider 28. A motion limiting element 46 (referred to in FIGS. 2 and 3 as an "op-shock limiter") depends down from the load/unload structure 42 toward the disk 20 and is spaced from the suspension 26 by the distance "C" in accordance with principles set forth above. The motion limiting element 46 is radially inward from the ramp 44 as shown, relative to the disk 20, but is nonetheless extensive only over the outer portion of the disk 20 (specifically, the below-described active region 50). In alternate embodiments, the motion limiting element 46 may be positioned over a radially inner ring of the disk, in which case the below-described active region would be the radially inner portion covered by the motion limiting element 46. For CSS drives that do not have a load/unload ramp, the motion limiting element can still be positioned over the active region 50 in a manner similar to that shown by FIG. 2.

In other words, the disk 20 in FIGS. 2 and 3 can be radially divided into three regions, denoted as "zones" in FIG. 3, with a data region 48 including two of these regions, namely, a radially outer ring-shaped active region 50 and an archival region 52 radially inside the active region 50. The outermost ring of the disk 20 is a landing region 54 that is provided in accordance with principles known in the art for loading and unloading the sliders of the disk drive. As mentioned above, in some embodiments the motion limiting element 46 is positioned over the innermost data bearing portion of the disk 20, in which case the active region is the innermost ring underneath the motion limiting element 46.

As set forth further below, the active region 50 contains data accessed most frequently, and the sliders 28, when operating in the active region 50, are protected from mechanical shock because the motion limiting element 46 is over the active region 50 and thus limits the motion of the suspensions 26 away from the disk. In contrast, the archival region 52 contains data that is used infrequently or irregularly. When operating in the archival region 52 the sliders 28 are not protected from shock by the motion limiting element 46.

Figure 4:
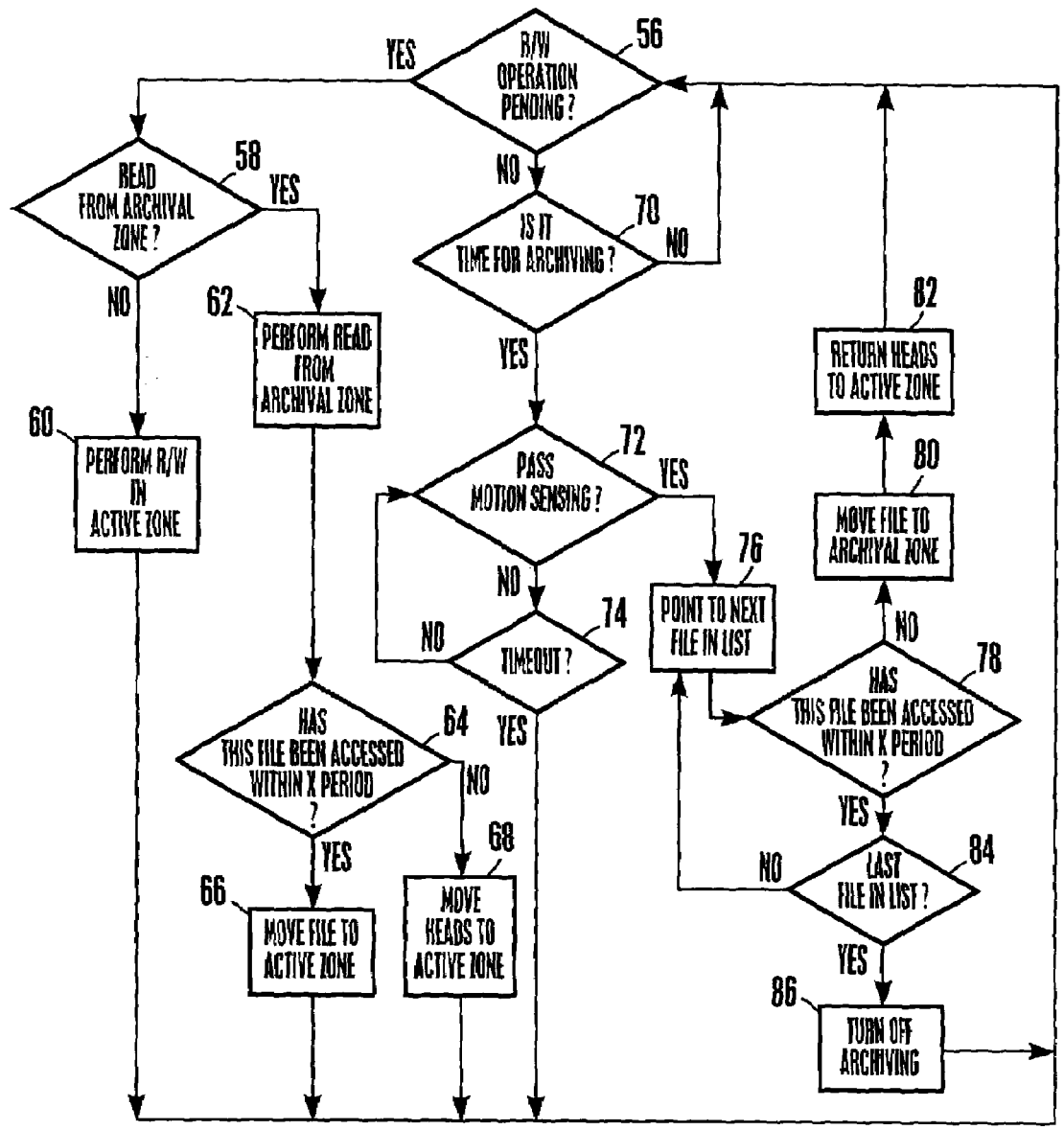
FIG. 4 is a flow chart of the logic for maximizing the time during operation that the slider is in the protected ("active") region.

FIG. 4 shows an algorithm that can be executed by the disk controller for optimizing the use of the active region 50 and archival region 52. It is to be understood that while in the non-limiting embodiment shown the motion limiting element of the present inventions defines the active region 50 to be a "safe" zone in that it is less susceptible to the effects of mechanical shock during operation than is the archival region 52, the term "active" region or "safe zone" as used herein more generally means a region that, compared to other regions on the disk, is rendered less susceptible to the effects of mechanical shock during operation by any means unless explicitly stated otherwise. For instance, the algorithm of FIG. 4 may be used with an "active region" that is made so by a thin protective coating.

Commencing at decision diamond 56, it is determined whether a read/write function is pending. If such a function is indeed pending, the logic determines whether data has been requested for a read from the archival region at diamond 58. Should the test at diamond 58 be negative, then the requested read/write function is performed in the active region designated at block 60, and the program then loops back to decision diamond 56. Accordingly, all operating system-initiated writes are initially performed in the active region 50.

With reference back to decision diamond 58, if the read is from the archival region, then the read is performed from the archival region at block 62. Proceeding to decision diamond 64, it is determined whether the requested data previously has been accessed within a predetermined ("X") period, which can be a length of time that is predetermined by the operator. If the data previously has been accessed within the designated period, the data is then moved to the active region at block 66 and then the program reverts back to diamond 56. However, if the file has not previously been accessed in the given time period, then the sliders are moved back to the active region at block 68 and the program reverts back to the initial diamond 56.

Referring back to decision diamond 56, should a read/write operation not be pending, the logic flows to decision diamond 70 wherein it is determined whether a time period for archiving has elapsed, and if so, the logic moves to decision diamond 72 to determine whether the drives' conventional shock sensor (or another sensor if desired) indicates that motion is being sensed. Should the program conclude that motion is being sensed, the decision is deferred to a loop between diamond 74 and decision diamond 72 to wait for the elapse of a timeout period. If the timeout period elapses before motion ceases, the entire operation reverts back to diamond 56. However, if motion ceases before the elapse of the timeout period, the logic flows from decision diamond 72 to block 76, which points to the next file on the read/write list and then directs the operation to decision diamond 78.

At decision diamond 78, it is determined whether the file pointed to at block 76 has been accessed within a predetermined period. If the file has not been accessed in the predetermined period, then the file is moved to the archival region at block 80 and the sliders return to the active region at block 82, where the shock limiter can protect against shock-induced induced slider-to-disk contact that could cause data loss. In this way, the sliders are protected from forays outside of the protected active region for the purpose of moving data to the archival region when motion is being sensed. If desired, while the physical location of data changes when it is moved from the active region to the archive region, its logical address can remain the same, so that the archiving is transparent to the operating system.

Looking back to decision diamond 78, if it is determined that the file has been accessed within the predetermined time period the logic flows to decision diamond 84, wherein it is determined whether the present file is the last file on the list. If the answer is negative, the operation is then sent back up to block 76, which points to the next file on the list. If the answer to decision diamond 84 is positive, the operation is sent to block 86, which turns off archiving and the entire operation is once again sent to the initial decision diamond 56.

With the above algorithm, it may now be appreciated that the active region 50 (i.e., the zone under the limiter 46) should not see any slider-disk contacts and so need not be devoid of data. Since the sliders spend most of their time on the disk in this zone, it makes most sense to keep data that is frequently accessed in this zone to improve drive performance in the event of shock during operation.

While the particular METHOD AND APPARATUS FOR LIMITING SHOCK DAMAGE TO HARD DISK DRIVE DURING OPERATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A disk drive controller executing logic including:
   establishing an active region on a disk in a disk drive associated with the controller, the active region being immediately under a motion limiting element that protrudes toward the disk such that effects of mechanical shock to the disk drive during read and/or write operations are mitigated in the active region compared to effects of mechanical shock to at least one archive region on the disk, data being moved from the active region to the archive region from time to time; and
   in response to write commands, always writing data to the active region.

2. The controller of claim 1, wherein the logic further comprises:
   moving data from the active region to an archive region based on at least one of: recency of last access of the data, whether a time for archiving has occurred, or whether a motion sensing threshold has been reached.

3. The controller of claim 2, wherein data is moved from the archive region to the active region if the data previously has been accessed within a predetermined period.

4. The controller of claim 2, wherein data is moved from the archive region to the active region only in the absence of motion of the disk drive below a threshold.

5. The controller of claim 1, wherein the active region is one and only one of: an outer annular region of the disk, or an inner annular region of the disk.

6. A hard disk drive comprising:
   motion limiting means protruding toward a disk for establishing an active region on the disk directly below the motion limiting means, an archive region of the disk also being established into which data is written from the active region from time to time based at least in part on whether a motion sensing threshold has been reached; and
   means for, in response to write command, always writing data to the active region.

7. The hard disk drive of claim 6, wherein the means for writing writes data from the archive region to the active region based on frequency and/or recency of access of the data.

8. The hard disk drive of claim 6, further comprising:
   means for moving data from the active region to an archive region based on at least one of: recency of last access of the data, or whether a time for archiving has occurred.

9. The hard disk drive of claim 8, wherein data is moved from the archive region to the active region if the data previously has been accessed within a predetermined period.

10. The hard disk drive of claim 6, wherein the active region is an outer annular region of the disk and does not extend into an inner annular region of the disk.

11. A hard disk drive, comprising:
    at least one disk having an active region and an archive region;
    at least one controller controlling read and write operations on the disk; and
    at least one motion limiting element being directly above and protruding toward the active region, the controller selectively moving data from the archive region to the active region without regard for the type of data being moved, wherein the active region corresponds to a region of the disk wherein effects of mechanical shock to the disk drive during read and/or write operations are mitigated compared to effects of mechanical shock in the archive region.

12. The hard disk drive of claim 11, wherein the controller stores data in the active region based on frequency and/or recency of access of the data.

13. The hard disk drive of claim 11, wherein the controller moves data from the active region to the archive region based on at least one of: recency of last access of the data, whether a time for archiving has occurred, or whether a motion sensing threshold has been reached.

14. The hard disk drive of claim 11, wherein the active region is one and only one of: an outer annular region of the disk, or an inner annular region of the disk.

15. The hard disk drive of claim 11, wherein data is moved from the archive region to the active region if the data has been accessed within a predetermined period.

* * * * *